UNITED STATES PATENT OFFICE.

N. A. DYAR, OF MEDFORD, AND J. F. AUGUSTUS, OF BOSTON, MASSACHUSETTS, ASSIGNORS TO JOSEPH C. TUCKER, OF BROOKLINE, N. H.

IMPROVED COMPOUND ILLUMINATING-FLUID.

Specification forming part of Letters Patent No. 25,362, dated September 6, 1859.

*To all whom it may concern:*

Be it known that we, NATHAN A. DYAR, of Medford, in the county of Middlesex, and JOHN F. AUGUSTUS, of Boston, in the county of Suffolk, both in the State of Massachusetts, have invented a new compound forming an oil or fluid suitable for burning for illuminating purposes in lamps in which flat wicks are used; and we do hereby declare that the following is a clear, full, and exact description of the same, and sufficient to enable those skilled in the art to which it most nearly appertains to practice our invention.

Our invention or discovery consists in the combination of three ingredients, each of which separately is old and well known, but which, to the best of our knowledge and belief, have not heretofore been combined in any proportion or for any purpose. These ingredients are known as resin-oil, fusel-oil, and alcohol. The proportions in which these are mingled to form our new compound, which we call "bituminous oil," vary considerably with the qualities of the different ingredients as they exist in the state in which they are bought and sold in commercial transactions. Our practice is to take of resin-oil three parts, with one part of fusel-oil, and one part of alcohol, mixing them thoroughly. This proportion is varied, as before stated, when the resin-oil is heavy, using proportionably of the alcohol and fusel-oil.

Having described our invention, what we claim as new, and desire to secure by Letters Patent of the United States, is—

The combination of the hereinbefore-mentioned ingredients, for the purpose set forth, and essentially in the proportions described.

N. A. DYAR.
JOHN F. AUGUSTUS.

Witnesses:
J. B. CROSBY,
W. B. GLEASON.